(12) United States Patent
Frank

(10) Patent No.: US 10,847,325 B2
(45) Date of Patent: Nov. 24, 2020

(54) ADVANCED DIELECTRIC ENERGY STORAGE DEVICE AND METHOD OF FABRICATION

(71) Applicant: BLUE HORIZON INNOVATIONS, LLC., Coconut Creek, FL (US)

(72) Inventor: David L. Frank, Highland Beach, FL (US)

(73) Assignee: BLUE HORIZON INNOVATIONS, LLC., Coconut Creek, FL (US)

( * ) Notice: Subject to any disclaimer, the term of this patent is extended or adjusted under 35 U.S.C. 154(b) by 0 days.

(21) Appl. No.: 16/453,722

(22) Filed: Jun. 26, 2019

(65) Prior Publication Data

US 2020/0082996 A1    Mar. 12, 2020

Related U.S. Application Data

(60) Division of application No. 15/660,613, filed on Jul. 26, 2017, now Pat. No. 10,347,433, which is a
(Continued)

(51) Int. Cl.
*H01G 4/30* (2006.01)
*H01G 4/12* (2006.01)
(Continued)

(52) U.S. Cl.
CPC .......... *H01G 11/12* (2013.01); *H01G 4/0085* (2013.01); *H01G 4/12* (2013.01); *H01G 4/1227* (2013.01);
(Continued)

(58) Field of Classification Search
CPC ........ H01G 11/12; H01G 11/14; H01G 11/16; H01G 11/84; H01G 11/30; H01G 4/232;
(Continued)

(56) References Cited

U.S. PATENT DOCUMENTS 2,490,733 A    12/1949 Kennedy
6,251,473 B1    6/2001 Wang et al.
(Continued)

FOREIGN PATENT DOCUMENTS

JP    2000269066    9/2000
JP    2005229104    8/2005
(Continued)

OTHER PUBLICATIONS

Office Action issued for Chinese patent application No. 201810813109.5 dated Dec. 25, 2019.
(Continued)

*Primary Examiner* — Arun Ramaswamy
(74) *Attorney, Agent, or Firm* — Jose Gutman; Fleit Intellectual Property Law

(57) ABSTRACT

A Dense Energy Ultra Cell (DEUC), a dielectric energy storage device and methods of fabrication therefor are provided. A DEUC element is fabricated using print technologies that deposit dielectric energy storage layers (406) and insulating layers (404) together being interleaved between electrode layers (403). The dielectric energy storage layers are created from a proprietary solution to enable printing of dielectric energy storage layers with high permittivity and a high internal resistivity to retain charge. The insulating layers (404) can be applied within the dielectric energy storage layers (406) bifurcating the dielectric energy storage layers for increased resistivity. As part of the fabrication process, the material deposition printer can apply multiple print heads each with different inks and materials (1301, 1302) to form composite material (1303) in the printed layers.

14 Claims, 14 Drawing Sheets

Related U.S. Application Data continuation-in-part of application No. 15/168,042, filed on May 28, 2016, now Pat. No. 10,269,493, which is a continuation-in-part of application No. 14/903,040, filed as application No. PCT/US2014/043416 on Jun. 20, 2014, now Pat. No. 9,899,154.

(60) Provisional application No. 62/514,627, filed on Jun. 2, 2017, provisional application No. 62/462,490, filed on Feb. 23, 2017, provisional application No. 62/446,763, filed on Jan. 16, 2017, provisional application No. 62/394,247, filed on Sep. 14, 2016, provisional application No. 62/323,647, filed on Apr. 16, 2016, provisional application No. 62/297,982, filed on Feb. 22, 2016, provisional application No. 62/293,910, filed on Feb. 11, 2016, provisional application No. 62/289,283, filed on Jan. 31, 2016, provisional application No. 62/277,598, filed on Jan. 12, 2016, provisional application No. 62/271,996, filed on Dec. 28, 2015, provisional application No. 62/271,923, filed on Dec. 28, 2015, provisional application No. 62/174,004, filed on Jun. 11, 2016, provisional application No. 62/168,768, filed on May 30, 2015, provisional application No. 61/983,407, filed on Apr. 23, 2014, provisional application No. 61/931,754, filed on Jan. 27, 2014, provisional application No. 61/910,921, filed on Dec. 2, 2013, provisional application No. 61/893,832, filed on Oct. 21, 2013, provisional application No. 61/875,076, filed on Sep. 8, 2013, provisional application No. 61/863,032, filed on Aug. 7, 2013, provisional application No. 61/863,042, filed on Aug. 7, 2013, provisional application No. 61/862,210, filed on Aug. 5, 2013, provisional application No. 61/958,330, filed on Jul. 25, 2013, provisional application No. 61/958,169, filed on Jul. 22, 2013, provisional application No. 61/957,517, filed on Jul. 6, 2013.

(51) Int. Cl.

| | |
|---|---|
| *H01G 4/008* | (2006.01) |
| *H01G 11/12* | (2013.01) |
| *H01G 11/72* | (2013.01) |
| *H01M 2/02* | (2006.01) |
| *H01G 4/38* | (2006.01) |

(52) U.S. Cl.
CPC .............. *H01G 4/30* (2013.01); *H01G 11/72* (2013.01); *H01M 2/029* (2013.01); *H01M 2/0277* (2013.01); *H01G 4/38* (2013.01); *H01M 2220/30* (2013.01); *Y02T 10/70* (2013.01)

(58) Field of Classification Search
CPC ........ H01G 4/1209; H01G 4/12; H01G 4/008; H01G 11/72; H01G 4/30; H01G 4/1227; H01G 4/0085; H01M 2/029; H01M 2/0277
USPC .... 361/321.1, 321.2, 321.4, 301.4, 311, 313, 361/320
See application file for complete search history.

(56) References Cited

U.S. PATENT DOCUMENTS

| | | | |
|---|---|---|---|
| 2002/0196957 A1 | 12/2002 | Andersen | |
| 2003/0026063 A1 | 2/2003 | Munshi | |
| 2006/0120020 A1 | 6/2006 | Frank | |
| 2006/0139845 A1* | 6/2006 | Hiramatsu | C04B 35/4682 361/272 |
| 2008/0003364 A1 | 1/2008 | Ginley et al. | |
| 2008/0220153 A1 | 9/2008 | Mukherjee et al. | |
| 2010/0002362 A1 | 1/2010 | Clelland et al. | |
| 2012/0171420 A1 | 7/2012 | Molins et al. | |
| 2014/0185187 A1 | 7/2014 | Bai | |
| 2014/0233153 A1 | 8/2014 | Chai et al. | |
| 2016/0038745 A1 | 2/2016 | Faltys et al. | |
| 2016/0155576 A1 | 6/2016 | Frank | |
| 2017/0004929 A1 | 1/2017 | Frank | |
| 2017/0250406 A1 | 8/2017 | Armand et al. | |
| 2017/0330695 A1 | 11/2017 | Frank | |

FOREIGN PATENT DOCUMENTS

| | | |
|---|---|---|
| JP | 2009038089 | 2/2009 |
| JP | 2013184846 | 9/2013 |
| JP | 2015151512 | 8/2015 |
| KR | 20070044109 | 4/2007 |
| KR | 1020130075566 | 7/2013 |
| WO | 2015006030 | 1/2015 |

OTHER PUBLICATIONS

Liang Fang, Mingrong Shen, Jing Yank, Zhenya, Reduced dielectric loss and leakage current in CaCu3Ti4O12/SiO2/CaCu3Ti4O12 multilayered films, 2005.
International Preliminary Report on Patentability dated May 28, 2015, received for International Application No. PCT/US14/43416.
International Search Report dated Oct. 10, 2014, received for International Application No. PCT/US14/43416.
PCT International Search Report and Written Opinion of the International Searching Authority for PCT Application No. PCT/US2017/043547 dated Nov. 21, 2017.
European search report issued for European Patent Application No. 18184285.7 dated Dec. 3, 2018.
Extended European search report issued for European Patent Application No. 18184285.7 dated Apr. 10, 2019.
PCT International Preliminary Report on Patentability for International Application No. PCT/US17/43547 completed on Jun. 11, 2018.

* cited by examiner

ADVANCED DIELECTRIC ENERGY STORAGE DEVICE AND METHOD OF FABRICATION

BACKGROUND

The present disclosure generally relates to energy storage devices that are based on ultra-capacitors, and more particularly to a hybrid ultra-capacitor and dense energy power storage device and methods of fabrication thereof.

Current battery and rechargeable battery technologies do not lend themselves to a broad range of applications. Large and heavy batteries are applied to electric vehicles and contribute a significant portion of the weight of the vehicle to enable driving range. Miniature batteries have been developed in recent years to address miniature sensors and actuators such as biomedical devices and wireless communication systems.

In the middle are requirements for portable electronic devices such as cellphones and computers. Chemical battery technologies have limited numbers of charge cycles before degradation of the battery charge capacity and are limited to 4 volts or less per cell.

Current capacitors have limited energy density and dissipate the stored charge quickly.

Many important applications demand high energy density, high operating voltage per cell, and an extended battery life-cycle.

Therefore a need exists to overcome the problems with the prior art as discussed above.

BRIEF SUMMARY

A Dense Energy Ultra Cell (DEUC), also referred to as a dielectric energy storage device, a dense energy power storage device, a hybrid ultra-capacitor, and the like, according to various embodiments is fabricated using print technologies that deposit dielectric layers interleaved between electrodes. The dielectric layers are created from a proprietary solution to enable printing of layers with high permittivity and a high internal resistivity to retain charge. Insulating layers may be applied within the dielectric layers for increased resistivity.

A hybrid ultra-capacitor and Dense Energy Ultra Cell (DEUC) energy storage device and methods of production are described herein using print processes to deposit energy storage layers that are interleaved in between electrodes to enable rapid charge and dense energy storage in a scalable DEUC Element to support a wide variety of applications.

The Dense Energy Ultra-Cell (DEUC) provides a super capacitor with dense energy storage technology that can be manufactured at a low cost. The DEUC utilizes a proprietary high dielectric material in a Nano Ink that is deposited in between the electrode elements. The DEUC design addresses seven critical issues in battery technology:

Significant Increase in Energy Density.
Ability to provide cell operating voltages of 120 Volts or more.
Reduced number of cells for energy storage applications.
Reduced size and weight.
Reduced cost.
No Hazardous Materials.
Rapid Recharge Capability.
Long Battery Life-Cycle: The DEUC is based on dielectric material that can provide hundreds of thousands of recharges without impact.
Reduced Price.

The transformational embodiments for the DEUC include a proprietary design enabling dense energy storage capacity in an ultra-capacitor and proprietary fabrication methods that provide for volume production of the DEUC at low cost.

The use of a dielectric energy storage device (ultra-capacitor) provides the inherent advantages of rapid charge, high operational voltages, a reduction in the number of cells required to reach an operational voltage, and provides hundreds of thousands of charge cycles without degradation.

A DEUC energy storage module, according to various embodiments, is designed as a scalable product supporting micro-battery applications, mobile devices, fixed energy backup, grid energy storage, alternative energy storage and large arrays for commercial, utility and government applications.

Various embodiments of the present invention enable the fabrication of an energy storage device with a base component (energy layer) that is comprised of a plurality of dielectric particles that form layers of less than 10 microns thick, with an internal resistivity of greater than 100 mega-ohms. These energy storage layers are interleaved in between electrode layers to form a multi-layer thin film. The energy storage layers may have insulating layers applied to increase resistivity between the electrodes. One or more multilayer thin films are applied to form a DEUC Element.

Layer Type: Electrode Layer

Electrode Layer:

A preferred conductive Ink type for the inner electrodes is comprised of a Nickel precursor that is stable at room temperature. The Nickel precursor has a metal ion that can be reduced to a pure metallic state by a reducing agent and heat. The reducing agent and nickel precursor are activated in the temperature in the range of 100–300° C. The reaction of the nickel precursor, reduction agent and heat forms a pure metal deposit.

The nickel precursor and reduction agent can be formulated into a Nano-Ink where the nickel precursor and reducing agent are loaded into a carrier fluid for use in a variety of print processes including inkjet printing, spray deposition and/or screen printing.

Nickel nanoparticles may be added and suspended in the nickel ink. When nickel is applied as the electrode, a reduced oxygen atmosphere is required to reduce and/or eliminate oxidation during heat treatments.

An insulating material is applied to the edges of the electrode layer.

Layer Type: Energy Storage Layer

Energy Storage Layer:

A dielectric energy storage layer comprised of a high dielectric material such as $Ca_aCu_xTi_4O_2$ and/or the proprietary formula of CCTO—X. A precursor of the CCTO—X is used as an ink for deposition. The precursor ink may have pre-calcined particles of CCTO—X suspended in the solution. The energy layer may also have Al2O3 particles (or other electrically insulating particles) applied in the mix.

The energy storage layer may have one or more insulating layers coupled with it. The insulating layers may be positioned between the dielectric energy storage layers and the electrode layers. An insulating layer, according to various embodiments, can bifurcate a dielectric energy storage layer dividing the energy storage layer into two parts.

The insulating layers may be positioned between the dielectric energy layer and the electrode layers and bifurcate the dielectric energy layer into two parts.

The DEUC dielectric energy storage layer, according to various embodiments, utilizes ink that may be synthesized as a precursor liquid for the dielectric material.

An insulating material is applied to the edges of the dielectric energy storage layer electrode layer to isolate electrical conductance through the dielectric energy layer.

The dielectric energy storage layer solution is deposited and subsequently dried to allow for the deposition of the next layer.

Layer Type: Insulating Layer

Insulating Layer:

The insulating layer ink, according to various embodiments, is comprised of aluminum oxide ($Al^2O^3$) and silicon oxide ($SiO^2$) particles that form a composite where $Al^2O^3$ particles are suspended in $SiO^2$ when heat treated and where the $SiO^2$ provides a bond between the adjacent ceramic energy storage layers.

Layer Type: Outside Cover for the DEUC

The outside cover layer for the DEUC is an insulating material that encases the DEUC with the exception of the left and right electrodes.

A multi-layer thin film is created by applying the inks described above. The multi-layer thin film is heat treated to form a DEUC Element.

An example print process for the DEUC multilayer thin film includes the following:

The energy layer may be formed by printing three sub-layers: dielectric energy storage layer/insulation layer/dielectric energy storage layer;

The electrode layer is printed with insulating material around the edges, except for the side where the electrode is attached to the collector; and The dielectric energy storage layers, bifurcated by an insulating layer, are interleaved in between electrode layers to form a unified multi-layer thin film.

In FIG. 1, according to an example, an internal layer barrier capacitor with a core (101) and barrier layer (102) is illustrated. In FIG. 2, according to an example, CCTO/CCTOX particles with a core (201) and barrier layer (202) and Al2O3 insulator particles (203) that position themselves in between the particles, are illustrated.

In FIG. 17, one example embodiment includes CCTO—X grains (1701) and Al2O3 particles (1711) positioned in between the CCTO—X grains (1701), and where the Al2O3 and barrier layer (1702) create increased resistivity.

The CCTO grains (1701) are combined with Al2O3 particles (1711) to form an energy storage layer (1714).

In this example, the energy storage layers (1711) are bifurcated by an insulating layer (1712).

According to various embodiments, an insulating layer may be applied as:

CCTO/Insulator/CCTO

Insulator/CCTO

Insulator/CCTO/Insulator

Insulator/CCTO/Insulator/CCTO/Insulator

The DEUC Multilayer Thin Film is heat treated to create the DEUC Element. One or more unified multilayer thin film(s) are combined and heat treated in specific stages to ensure the Nanoparticles in each layer remain in place as the multilayer thin film is cured, calcined and sintered:

- as a first heat stage, the electrode ink cures forming a frame work structure within the multilayer film holding the nanoparticles between the electrodes in place, and
- as a second heat stage, the ink fluids and contaminants are burned off, and
- as a third heat stage the Nanoparticles within the multilayer thin film are calcined, and
- as a fourth heat stage, the multilayer thin film is sintered forming the ceramic energy storage layer bifurcated by a hardened $SiO^2/Al^2O^3$ layer resulting in a hardened multilayer energy storage device with left and right collectors (electrodes), thereby providing a DEUC Element The sintering of the multilayer thin film results in the formation of a resistive barrier around the CCTO and/or CCTO—X particle core. This resistive barrier forms an internal barrier capacitor.

In some general respects, the fabrication method for the DEUC thin film is similar to a fabrication method for multi-layer ceramic capacitors (MLCC), but with critical differences to enable high energy density and low leakage after charge.

The DEUC Thin Film is defined as one or more layers of electrodes that are spaced apart by energy storage layers. The energy storage layers may include an insulating layer that bifurcates an energy storage layer. The energy storage layers may include one or more insulating layers that separate the energy layer from one or more of the electrodes.

One or more DEUC thin films may be stacked to create a larger DEUC Element. One or more DEUC Elements can be interconnected to form a DEUC Stack. One or more DEUC Stacks may form a DEUC Cell. A DEUC Module can be formed from one or multiple DEUC cells.

In a combined application, at least one DEUC module is coupled with at least one of: one or more solar cells, one or more radioisotope power cells, a photovoltaic system, a thermal voltaic system, a movement charge system, and a manual charge system, for providing electric charge to the DEUC module and electric energy storage by the DEUC module.

In various alternative embodiments, at least one DEUC module is designed and fabricated to power at least one of: micro devices, integrated circuits, electric vehicles, unmanned aerial vehicles, electronic cigarettes, mobile computing devices, laptops, tablets, mobile phones, wireless communication devices, mobile sensor systems.

In further various alternative embodiments, at least one suspended particle DEUC module is designed and fabricated for at least one of: electric power grid support and to provide uninterruptible power supplies.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
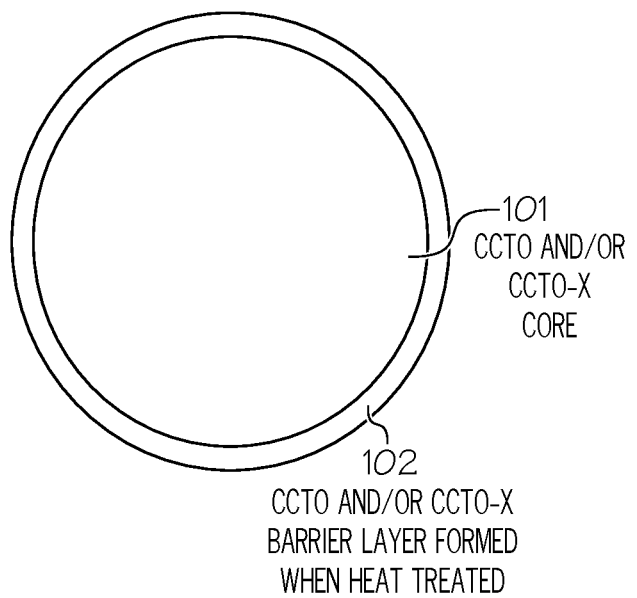
FIG. 1 is an illustration showing an example of an Internal Layer Barrier Capacitor (ILBC), according to the present disclosure.
Figure 2:
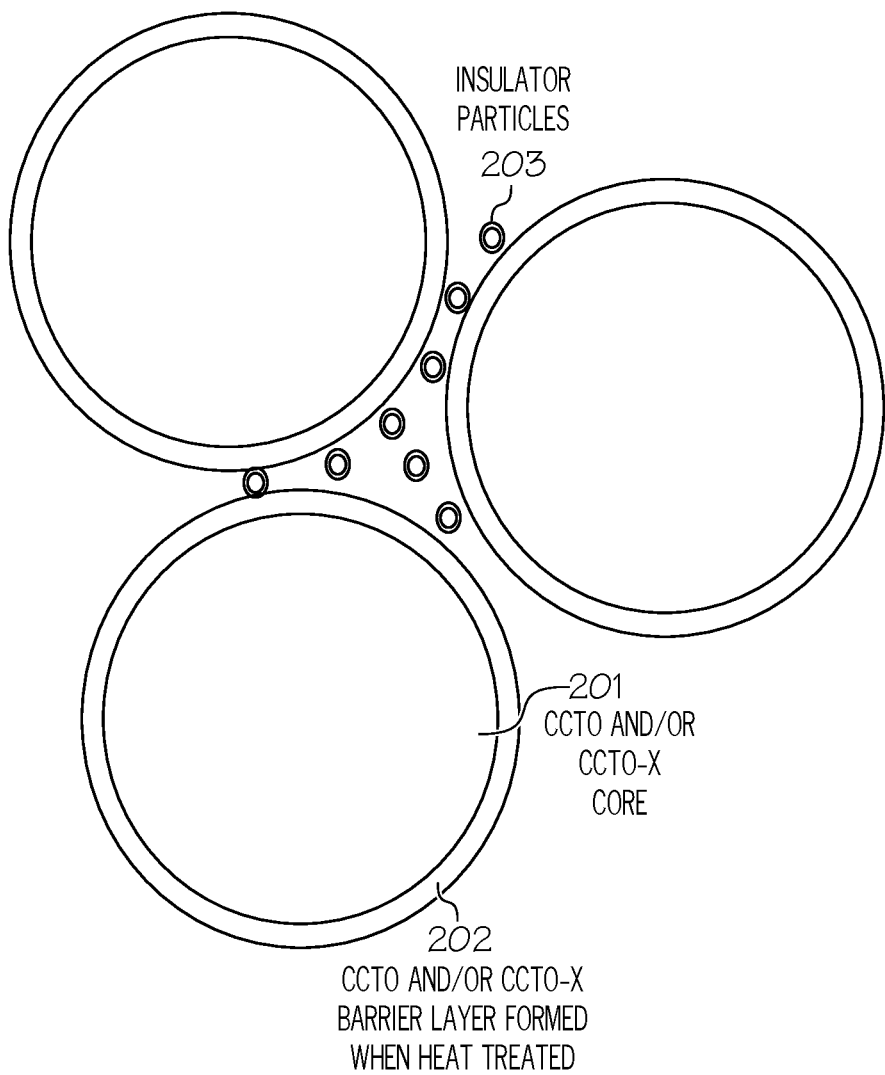
FIG. 2 is an illustration showing an example of an ILBC with insulator particles, according to the present disclosure.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system can similarly be used by various embodiments of the present disclosure. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The present disclosure provides, according to one embodiment, a hybrid ultra-capacitor/deep cell battery technology and applies a high dielectric material that forms an energy storage layer interleaved between anode and cathode conductor elements forming an energy storage element. The inventor has named this new technology as a Dense Energy Ultra Cell. The base component of the Dense Energy Ultra Cell is the DEUC Element. One or more DEUC Elements can be combined to form the Dense Energy Ultra Cell.

In one embodiment, proposed is a Dense Energy Ultra Cell (DEUC) where a DEUC Element is the basic building block. The DEUC Element is comprised of: a plurality of dielectric energy storage layers comprised of CCTO and/or CCTO—X layers that are combined with insulating layers. In one configuration, at least one of the dielectric energy storage layers is bifurcated by an insulating material layer, creating a high dielectric layer with high internal resistivity, where one or more energy storage layers, each are less than 10 microns thick that are interleaved between at least two of the electrical conducting layers that are electrode layers. This device could be fabricated using spray and/or drop on demand deposition system to create a multilayer DEUC Thin Film. In addition, the core of the particle can be comprised of a calcium copper titanate oxide ($CaCu_3Ti_4O_2$), also known as (CCTO) and/or CCTO—X as defined in this application. The core CCTO may have variations in the amounts of copper and/or calcium content to reduce grain boundaries within the CCTO crystal to form CCTO—X. The CCTO and/or CCTO—X may have alumina added to the chemical formula and/or have $Al2O3$ electrically insulating nanoparticles applied.

The dielectric energy storage layer, insulating layer and electrode layers are applied as inks to be deposited using an inkjet printer or spray deposition system. The dielectric energy storage layer ink is created using a precursor to the CCTO/CCTO—X nanoparticles. The insulator ink may be formed from nanoparticles suspended in a solvent. The electrode ink may be formed with reactive ink that converts into silver when heated.

An inkjet printer provides for a drop on demand deposition. The inkjet deposition processes may print alternate electrode, energy layers and/or other components to form a DEUC Thin Film.

Spray deposition is a method of printing one or more energy layers, electrode layers or any other subcomponents of the DEUC Element. The spray deposition processes may print alternate electrode, energy layers and/or other components to form a DEUC Thin Film. There is a wide variety of spray deposition processes that are included but not limited to ink-jet, ultrasonic, thermal and pressurized spray.

DEUC Energy Ultra-Cell (DEUC)

The Dense Energy Ultra Cell (DEUC) energy storage device, according to various embodiments, is comprised of one or more DEUC Elements where the DEUC Elements are comprised of:

A plurality of dielectric particles and aluminum oxide ($Al_2O_3$) particles forming a ceramic layer of up to 10 microns thick that is a dielectric energy storage layer, and One more of the dielectric energy storage layers are encapsulated by insulating layers, and The insulating layers bond to adjacent one or more of the dielectric energy storage layers, and Where the one or more dielectric energy storage layers, encapsulated by the insulating layers, are interleaved in between electrode layers to form a multi-layer thin film, and Where the insulating layers that encapsulate one or more of the dielectric energy storage layers create resistivity between the electrode layers, and f. Where the high resistivity of the insulating layers that encapsulate the dielectric energy storage layers between the electrode layers is greater than $10^4$ ohms and with a breakdown voltage of the DEUC Element above 50 Volts and reduced self-discharge rate of less than 20% per year in the DEUC Element.

Figure 3:
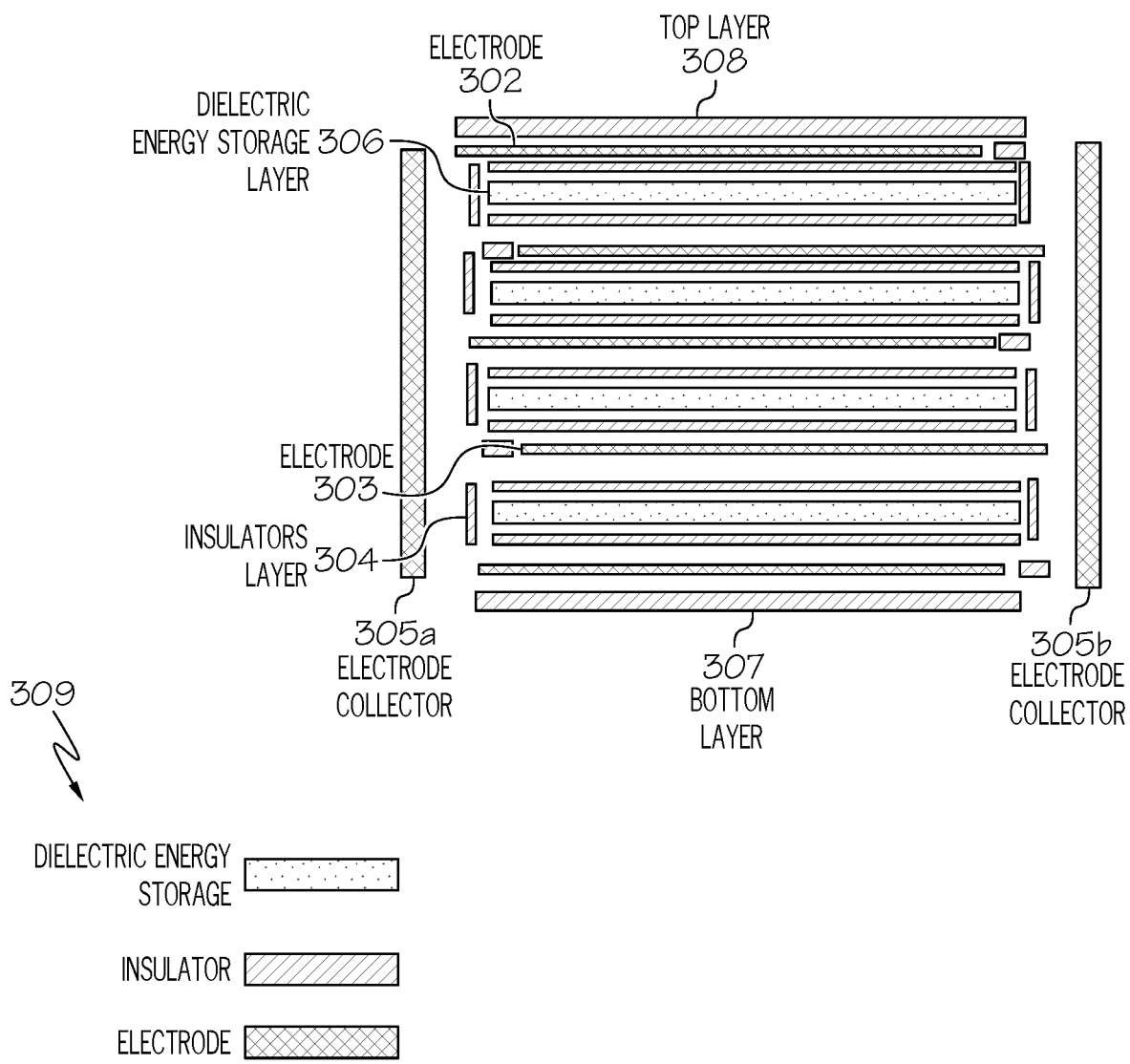
FIG. 3 is an illustration showing an exploded view of an example DEUC Thin Film with encapsulated dielectric energy storage layer, according to the present disclosure.

FIG. 3 illustrates an example of a Dense Energy Ultra Cell (DEUC) with insulating layers and insulating material (304) that encapsulate the dielectric energy storage layers (306) and separate the dielectric energy storage layers (306) from the electrode layers (303). A top and bottom insulating layer (307, 308) are applied to complete an outside cover to insulate the DEUC. Insulating material (304) is applied to isolate one dielectric energy storage layer (306) from direct physical contact (and accordingly direct electrical connection) with another dielectric energy storage layer (306).

Figure 4:
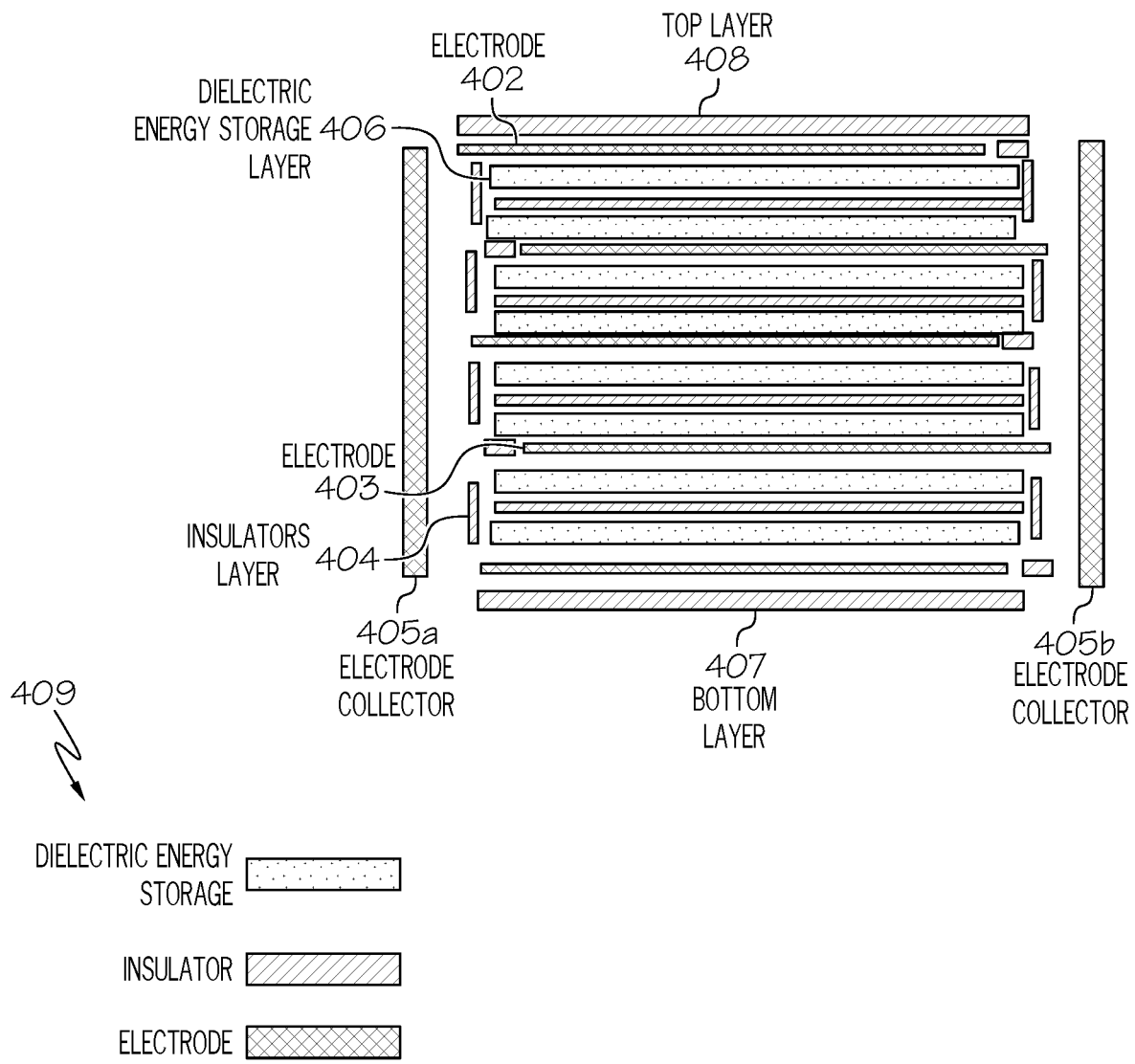
FIG. 4 is a cross section view of an example DEUC Thin Film with a bifurcated encapsulated dielectric energy storage layer, according to the present disclosure.

In FIG. 4 we illustrate The Dense Energy Ultra Cell (DEUC) where two encapsulated dielectric energy storage layers (406) are combined as dielectrics in series between the electrode layers and where the encapsulating insulation layers (404) bifurcate the dielectric energy storage layers and separate the dielectric energy storage layers from the electrode layers (402). A top and bottom insulating layer (407, 408) are applied to complete an outside cover to insulate the DEUC. Insulating material (404) is applied to isolate one dielectric energy storage layer (406) from direct physical contact (and accordingly direct electrical connection) with another dielectric energy storage layer (406).

Figure 5:
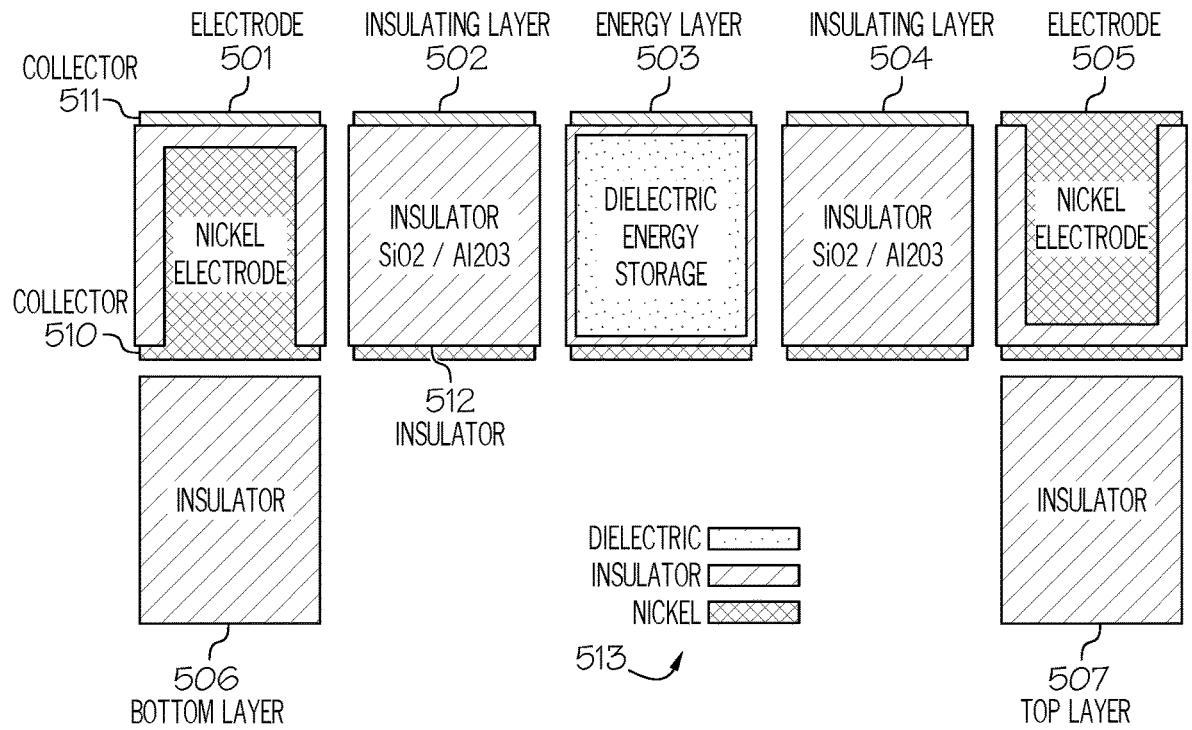
FIG. 5 is a top view of an example DEUC Thin Film with encapsulated dielectric energy storage layer, according to the present disclosure.

FIG. 5 illustrates example of print patterns for a DEUC Element that applies an encapsulated dielectric energy storage layer that is encapsulated.

a. Where the inner electrodes (501 and 505) are smaller in width and length than the dielectric energy layer to avoid contact with other electrodes, except where connected to an electrode array collector that forms an outer electrode, and b. Where insulating material (512) is applied to the outer edges of each left and right electrodes (501 and 505), except where connected to the collector (510 and 511), to avoid potential interaction (e.g., direct physical contact) between the left and right electrodes (501 and 505) and to eliminate an electrical path between dielectric energy layers (503), and c. Where the inner left (501) and inner right inner (505) electrodes are each combined into a left (510) and right (511) collector that forms the outer left and right electrode, d. The inner electrodes alternate as right and left inner electrodes, and e. The dielectric energy storage layer (503) is encapsulated by insulating layers (502 and 504) and by insulating material (512).

Figure 6:
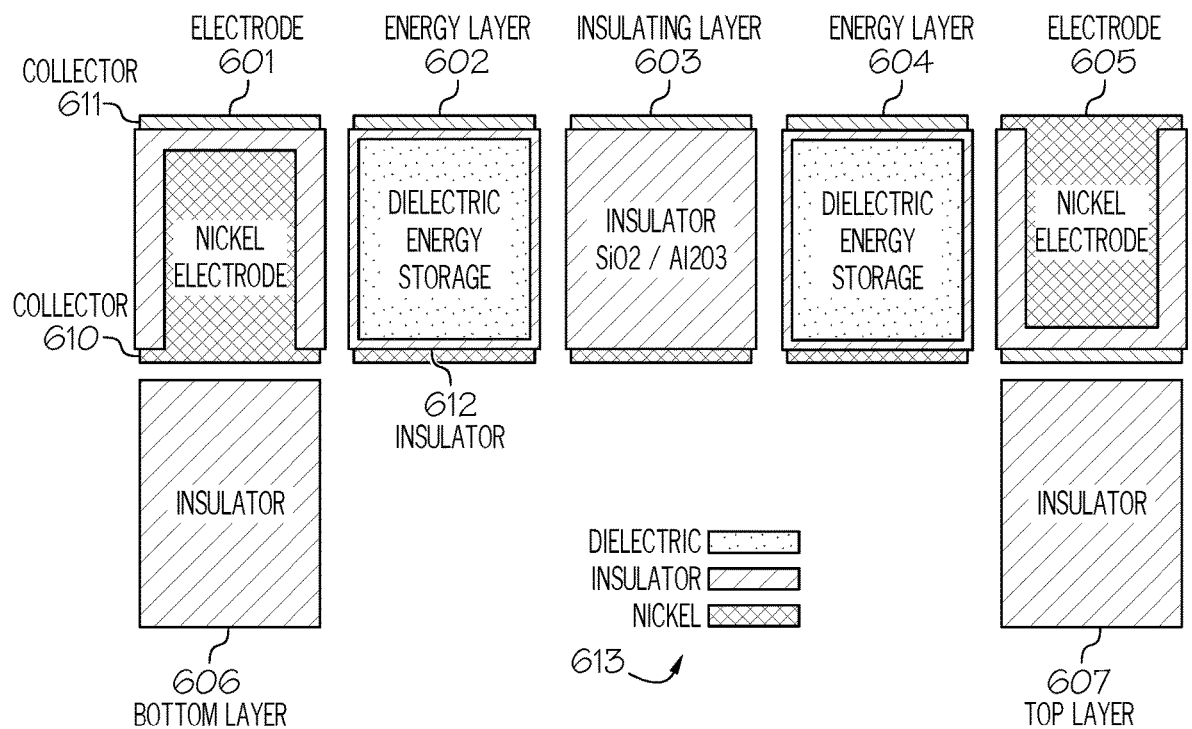
FIG. 6 is a top view of an example DEUC Thin Film with bifurcated dielectric energy storage layer, according to the present disclosure.

FIG. 6 illustrates example of print patterns for a DEUC Element that applies a bifurcated dielectric energy storage layer.

a. Where the inner electrodes (601 and 605) are smaller in width and length than the dielectric energy layer to avoid contact with other electrodes, except where connected to an electrode array collector that forms an outer electrode, b. Where insulating material (612) is applied to the outer edges of each left and right electrodes (601 and 605), except where connected to the collector (610 and 611), to avoid potential interaction (e.g., direct physical contact) between the left and right electrodes (601 and 605) and to eliminate an electrical path between dielectric energy layers (602 and 604), c. Where the inner left (601) and inner right (605) electrodes are each combined into a left (611) and right (610) collector that forms the outer left and right electrode, d. The inner electrodes alternate as right and left inner electrodes, and e. The dielectric energy storage layers (602 and 604) are bifurcated by insulating layer 603 and encapsulated by insulating material (612), insulating layer (603), electrode layers (601 and 605), and where bottom and top insulating layers (606, 607) cover a multi-layer thin film of the DEUC Element.

The insulating layer and the insulating material are comprised of aluminum oxide ($Al_2O_3$) and silicon oxide ($SiO_2$) particles that form a composite where $Al_2O_3$ particles are suspended in $SiO_2$ when heat treated and where the $SiO_2$ provides a bond between the adjacent ceramic energy storage layers.

Figure 7:
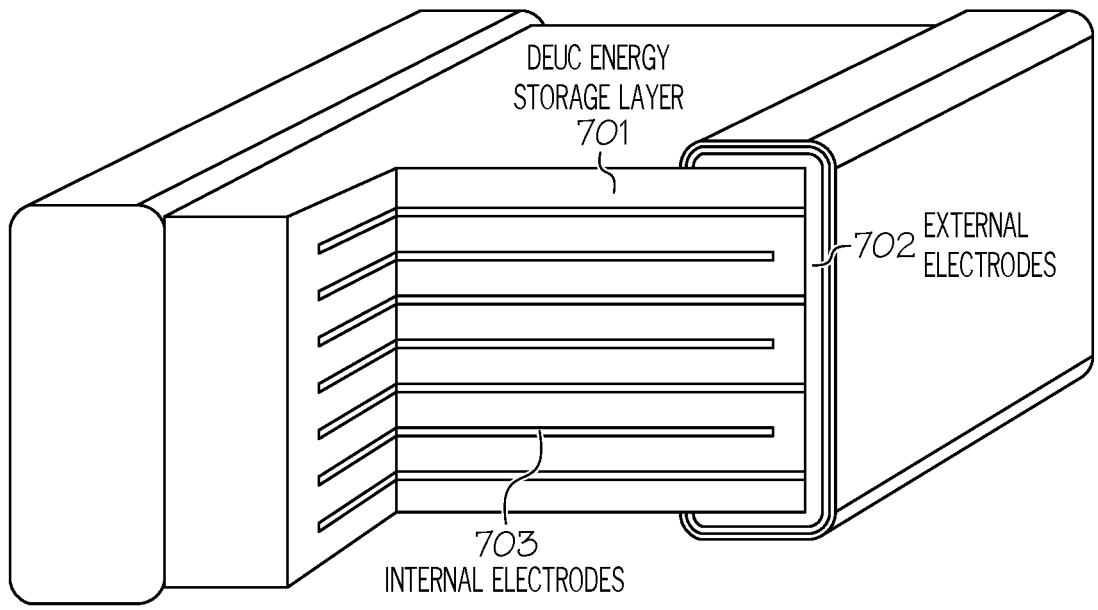
FIG. 7 is an illustration showing an example of a DEUC Element comprising an energy storage device with an MLCC structure, according to the present disclosure.

The individual electrode layers (702) within the DEUC Element, shown in the example of FIG. 7, act as a safety fuse to disconnect upon high heat, high voltage or high amperage.

Figure 8:
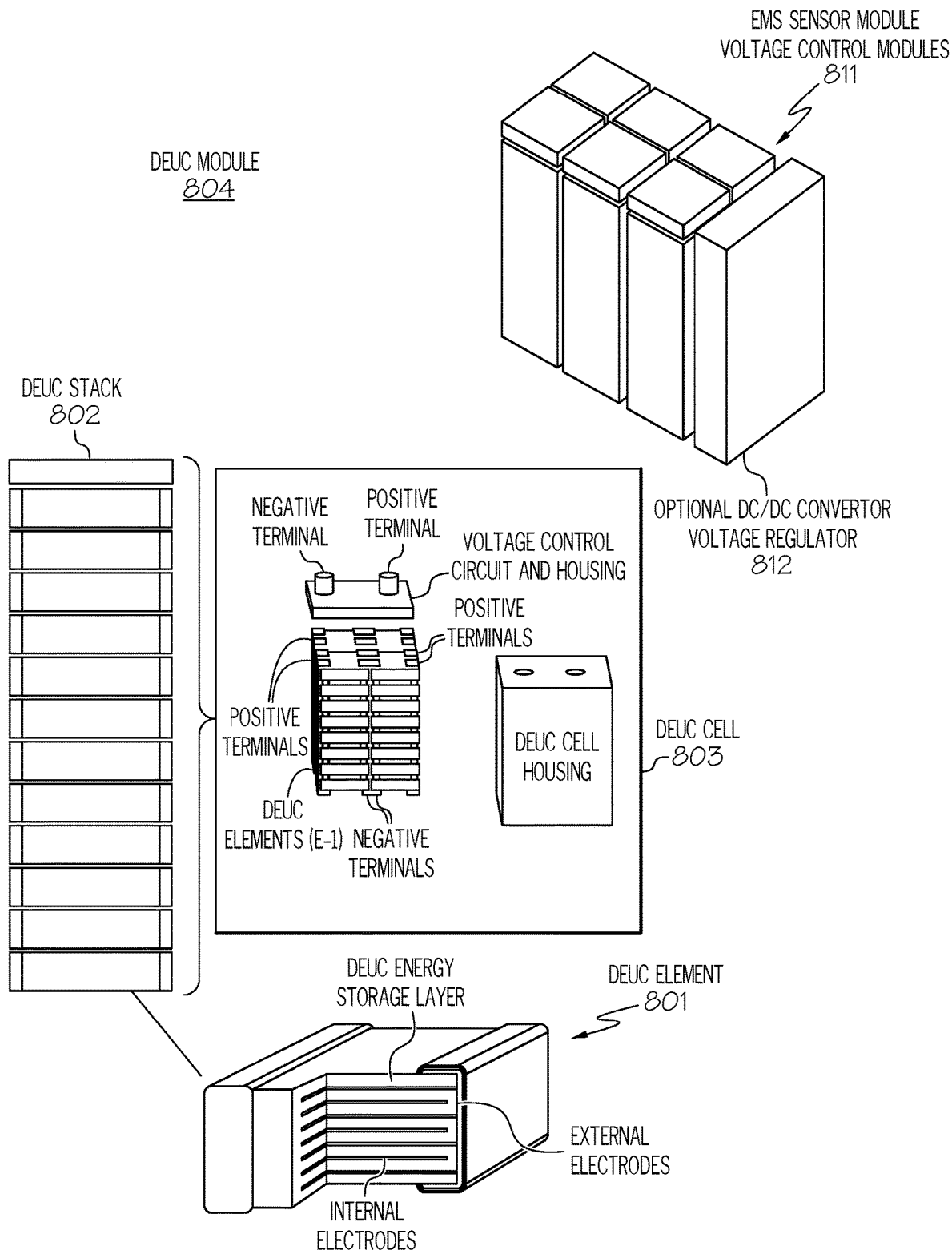
FIG. 8 is an illustration showing an example of DEUC Module components and supporting electronics, according to the present disclosure.

FIG. 8 illustrates an example of how the DEUC Element (801) can be used as a building block to create a DEUC stack (802) and where one or more DEUC Stacks (802) are combined to create a DEUC Cell (803) and where one or more DEUC Cells can be combined to create a DEUC Module (804).

The DEUC Module can be created from one or more of the following:

A DEUC Element (801)

The building block of the DEUC Cell where one or more DEUC Elements can create a DEUC Cell, and A DEUC Stack (802)

Where one or more DEUC Elements are connected series and/or parallel circuit(s) to form a DEUC Cell, and A DEUC Cell (803)

Where one or more DEUC Elements and/or DEUC Stacks are connected series and/or parallel circuit(s) to form a DEUC Cell, and A DEUC Module (804)

Where one or more DEUC Cells are combined and interconnected in series and/or parallel circuit(s) to form a DEUC Module, and DEUC Module Array:

Where one or more DEUC Modules are combined and interconnected in series and/or parallel circuit(s) to form a DEUC Module Array.

The dielectric material in the dielectric energy storage layers are comprised of CCTO—X which is comprised of modified calcium, copper, titanate, oxide ($CaCu_3Ti_4O_2$) and aluminum oxide ($Al^2O^3$) particles which is known as (CCTO—X), with variations in the amounts of copper and/or calcium and/or titanate content to increase the resistivity, permittivity and capacitance when sintered. This capacitance of the dielectric energy storage layer is frequency dependent between the frequencies of zero hertz to 1,000 hertz with raised capacitance at a linear ratio up to 100 hertz.

DEUC Fabrication Methods

One method of fabrication of a DEUC Element using inkjet printing comprising:

Preparation of an electrode material deposition solution that is used as an ink in an inkjet printer, by preparing an electrically conducting print solution created using a reactive solution that converts to nickel when heated to between 100 to 300 degrees Celsius and where nickel nanoparticles are suspended in the reactive solution;

Preparation of a ceramic dielectric solution that is used as an ink in an inkjet printer to produce the dielectric energy storage layer;

A precursor solution of a dielectric material CCTO and/or CCTO—X is synthesized as a printable ink; and Pre-calcined CCTO and/or CCTO—X nanoparticles are suspended in the precursor solution, and Aluminum oxide ($Al^2O^3$) nanoparticles suspended in an ink are prepared for co-deposition with the CCTO—X ink;

Preparation of an insulating material in solution that is used as an ink in an inkjet printer to produce the insulating layer by an insulator ink being created from silicon oxide ($SiO^2$) and aluminum oxide ($Al^2O^3$) and applied as an insulating layer;

DEUC Thin Film

The electrode layer ink, dielectric energy storage layer ink and insulator ink are applied as layers to form dense energy ultra-cell thin film as follows:

i. The energy layer is formed by printing three sublayers: a dielectric energy storage layer, an insulation layer and a dielectric energy storage layer.

ii. The electrode layer is printed with an insulating material around the edges, except for the side where the electrode is attached to a collector portion of all electrode layers of the same polarity, iii. The dielectric energy storage layers, bifurcated by an insulating layer, are interleaved in between electrode layers to form unified multi-layer thin films, and Sintering of Unified DEUC Thin Film Where one or more unified multilayer thin film(s) are combined and heat treated in specific stages to ensure Nanoparticles in each layer remain in place as the multilayer thin film is cured, calcined and sintered:

i. as a first heat stage, the electrode ink cures forming a frame work structure within the multilayer film holding the nanoparticles between the electrodes in place, and ii. As a second heat stage, the ink fluids and contaminants are burned off, and iii. As a third heat stage the Nanoparticles within the multilayer thin film are calcined, and iv. As a fourth heat stage, the multilayer thin film is sintered forming the ceramic energy storage layer bifurcated by a hardened $SiO^2$ combined with $Al^2O^3$ as a composite layer resulting in a hardened multilayer energy storage device with left and right collectors (electrodes), a DEUC Element.

In one embodiment, the electrode layer ink is comprised of a reactive nickel solution comprised of nickel(II) formate dihydrate [$Ni(HCO_2)_2.2H_2O$] and thylene diamine in an solvent. Nickel nanoparticles can be added to the electrode layer ink.

In another embodiment the electrode ink is comprised of nickel nanoparticles suspended in a solution.

One or more CCTO—X layers, according to this example, are formed from an ink comprised of a CCTO—X precursor solution and/or CCTO—X pre-calcined nanoparticles suspended in said solution. One or more heat treatments of the CCTO and/or CCTO—X particles, and/or energy layer, and/or multilayer thin film can use a reduced oxygen atmosphere to reduce and/or eliminate oxidation during the heat treatments.

The heat treatments of the CCTO and/or CCTO—X particles (grains) form an internal layer barrier capacitor (ILBC) with $Al^2O^3$ particles positioned between the grains increasing permittivity and resistivity.

The DEUC device is designed and fabricated to store and provide electrical power to at least one of, but not limited to:

micro devices and integrated circuits, electric vehicles, aircraft, boats, ships, unmanned aerial, terrestrial or water vehicles, electronic cigarettes, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

In one embodiment, the DEUC Element utilizes a pulsed direct current to increase capacitance when charging.

A voltage regulator provides one or more discharge voltages from the DEUC Element that are equal to or lower in voltage than the charged voltage in the DEUC Element and/or DEUC Cell.

Novel Inkjet Print Methods

Inkjet printing is used to deposit the layers of the DEUC Thin Film. Particles and/or precursor material used for the fabrication of the DEUC layers. In some cases, composite materials are applied using two or more print heads to create a composite at the printed layer.

Figure 13:
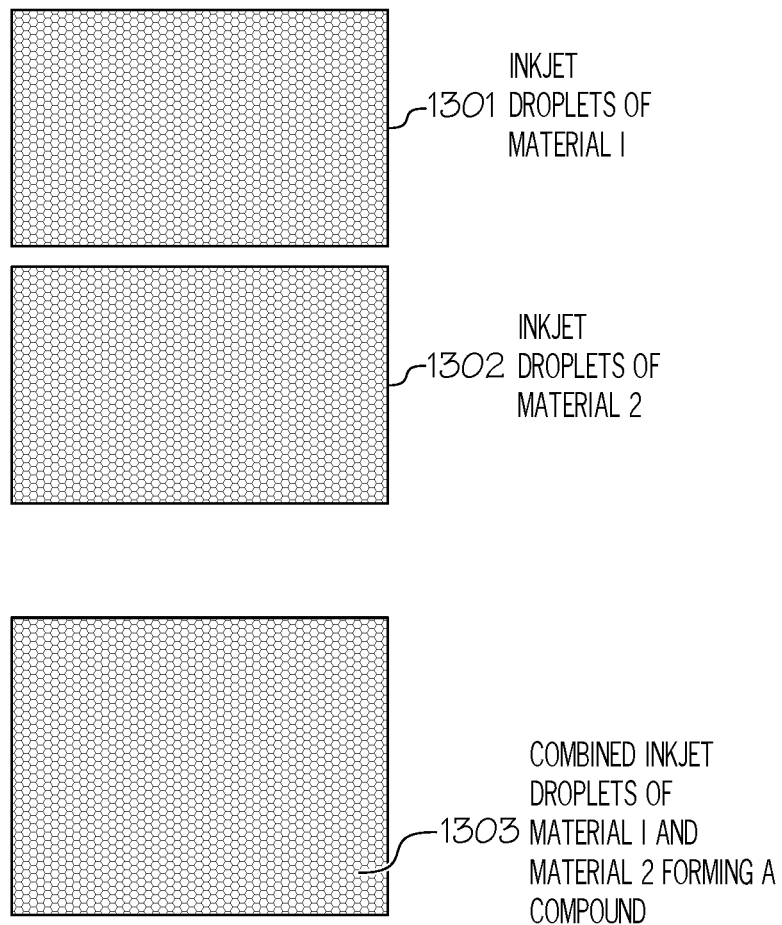
FIG. 13 is an illustration showing a composite material at the deposition layer in Inkjet printing according to the present disclosure.

In FIG. 13, illustrated is the printing of two individual types of materials in inkjet droplets (3102, 1302) and the combined materials as composite in 3103). The different materials are mixed to create a uniform composite of the two or more materials deposited.

Figure 15:
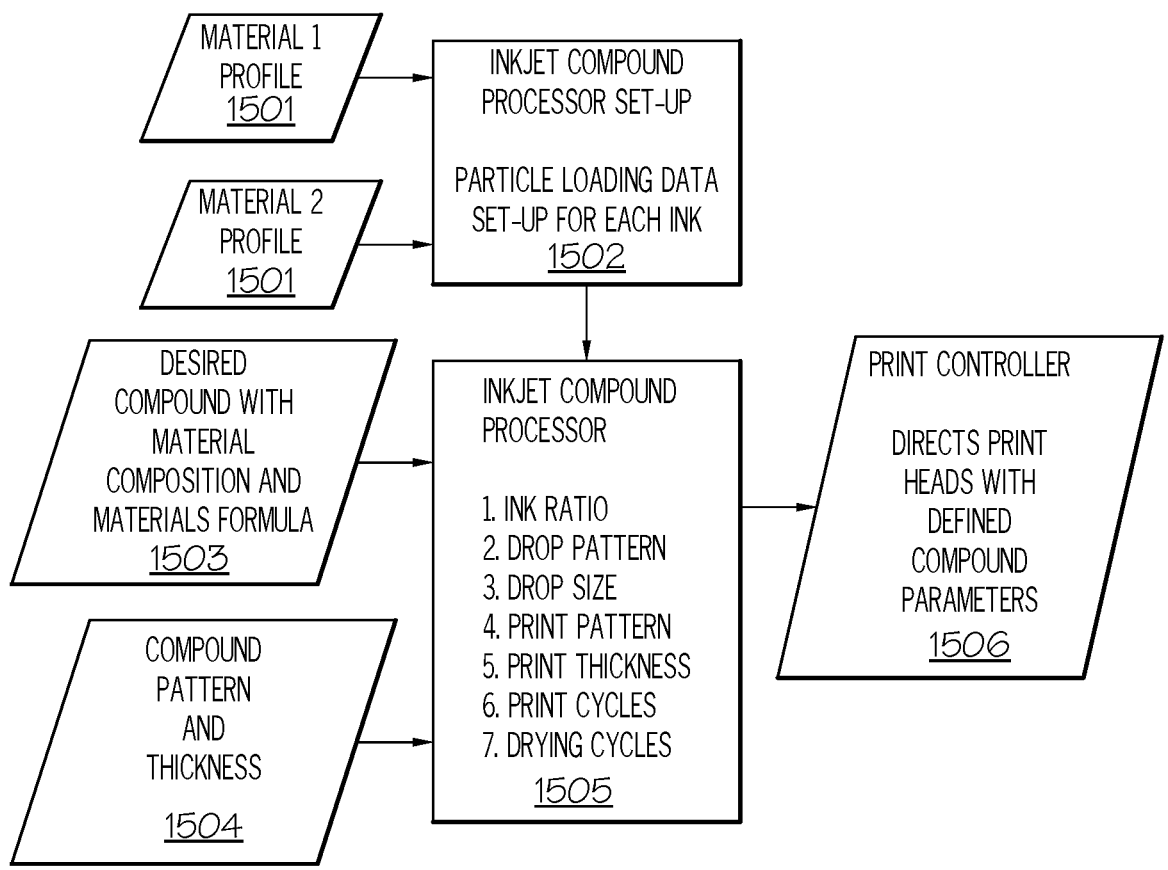
FIG. 15 is a flow diagram showing an example of an Inkjet compound material deposition process, according to the present disclosure.

In FIG. 15, a computer device (1502) compiles the inkjet compound set-up (1502) derived from the particle loading data 1501) for each deposition material (ink) profile.

One or more materials are combined to form an ink and where two or more inks are deposited into the same layer by two or more spray or drop on demand devices into the same deposition layer to forty a compound. The inkjet processor (1505) identifies the ink ratio, drop pattern, drop size, print pattern, print thickness, number of print cycles and drying cycles for the print operation, and sends this data to the print controller (1506) drive the printer and produce the desired printed pattern.

The proportions of the one or more material inks are deposited as spray droplets configured to achieve a composite ma sired stoichiometric formula.

Consecutive independent layers may be printed on top of existing layers as single material layers and/or composite material layers. One or more layers may be deposited to create a single layer and/or multilayer device.

The print process may corporate one or more single ink print layers and one or more multi-ink composite print layers in any configuration, and a computer device can calculate the amount and dispersion method for each material to be deposited to form the desired composite layers, and the inkjet deposition method described above can be used to fabricate an electronic circuit comprised of single and multilayer devices, electronic devices, circuit patterns, a battery, capacitor and/or an energy storage capacitor.

Calcium Copper Titanate Oxide (CCTO and CCTO—X)

Pure CCTO bulk properties are optimized by reducing impurities and anomalies to improve performance in the Dense Energy Ultra Cell. The inventor has created a proprietary CCTO utilizing variations in copper content and/or Titanate content and/or doping with a metallic material called CCTO—X.

The CCTO/CCTO—X energy storage material can be created by developing an ink from the Sol-Gel process. Here, the chemicals are combined to form a Sol. The Sol is prevented from converting to Gel. The Sol is used as an ink for the inkjet deposition system.

The chemical procedure known as Sol-Gel is widely used in chemistry to synthesize nanoparticles. In Sol-Gel, the 'sol' (or solution of multiple chemicals suspended in solution) gradually evolves towards the formation of a gel-like diphasic system. Removal of the remaining liquid (solvent) phase requires a drying process, which is typically accompanied by a significant amount of shrinkage and densification.

The Sol is actually a precursor that can be deposited on a substrate to form a film or used to synthesize powders. The sol-gel approach is a cheap and low-temperature technique that allows for the fine control of the product's chemical composition and can be used in ceramics processing of very thin films.

CCTO—X is a unique version of Calcium Copper Titanate Oxide where Calcium Copper Titanate Oxide ($Ca_aCu_3Ti_4O_2$) commonly referred to as CCTO is modified to form the unique CCTO—X ($Ca_aCu_xTiyO_2$); where variations in the stoichiometric values (a, x and y) include amounts of Ca, Cu and/or Ti content and where (a) is greater than 1, and/or (x) is less than or greater than 3 and/or (y) is less than or greater than 4.

The CCTO—X may be doped with one or more materials including but not limited to at least one of alumina, Al2O3, calcium oxide, zinc, silver, aluminum, strontium, boron and lanthanum.

Stoichiometric values are used in the calculation of relative quantities of chemicals, reactants and products to be placed in a chemical reaction process to produce a specific product or compound.

Altering the Copper and/or Calcium and/or Titinate in the stoichiometric formula may increase the resistance at the CCTO grain boundaries of the CCTO structure.

The CCTO dielectric material is derived from compounds found in group IIA, IB, IV of the periodic table, with dopants from a variety of periodic table groups such as cobalt which is in group VIII.

The inventor has discovered that the dielectric permittivity of $Ca_aCu_xTiyO2$ composition changes with the amount of calcium oxide and/or copper applied and with grain sizes and effects on the grain boundaries.

For volume production of the CCTO—X core shell particles, we offer a Sol-Gel, flame assisted spray pyrolysis or supercritical fluid methods. We may use a hydrogen-hydrothermal reactor where disassociated hydrogen and/or oxygen and steam are added to the supercritical fluid in a reaction area to form the Nano particles and/or coat the Nano particles.

The three primary methods used to synthesize dielectric Nano particles with high permittivity are:
1. Sol-Gel Method;
2. Multi-Stage Flame Spray Pyrolysis (MFSP); and
3. HHR Reaction Tube and Supercritical Fluid Nanoparticle Synthesis.

Insulating Layer

The insulating layer separating the energy storage layers can be comprised of any insulating material. In the preferred embodiment, the insulating material is alumina oxide or Al2O3. We have loaded Al2O3 nanoparticles into SiO2 to create a compound that easily attaches to the CCTO and/or CCTO—X layers. The Al2O3 raises the resistivity of the SiO2 layer.

Aluminum oxide nanoparticles are dispersed and suspended in SiO2 and the compound is dispersed in a solvent such as water and/or ethanol to be used as a print solution.

Dielectric Energy Storage Layer

The energy storage ceramic may be deposited as a liquid precursor for CCTO and/or CCTO—X. The precursor is created by mixing specific chemical in a solution. The precursor solution is deposited in a layer by inkjet or spray deposition methods. The layer of precursor material is heated to dry the liquid forming nanoparticles. The nanoparticle layer is heat treated to calcine the particles and then sintered to form a dielectric layer.

Alumina may be added to the CCTO and/or CCTO—X precursor.

Alumina may be added to the CCTO and/or CCTO—X nanoparticles prior to calcination.

Pre-calcined CCTO and/or CCTO—X nanoparticles may be added to the CCTO/CCTO—X precursor solution and ink.

In one embodiment of the invention, the precursor solution utilized for the inkjet printing uses three chemicals suspended in solutions that are combined to form the CCTO and/or CCTO—X liquid precursor. The combined solution is applied as precursor and an ink for inkjet printing.

The precursor ink is applied as an energy storage layer in the multilayer DEUC module. The multilayer DEUC is heat treated to allow the CCTO and/or CCTO—X precursor to dry, forming nanoparticles in the layer. The nanoparticles are calcined in place and subsequently sintered to form the dielectric energy storage layer.

Electrodes

There are multiple types of electrodes applied to the DEUC design. The primary electrodes are the inner electrodes applied in between the energy storage layers and the secondary electrodes that connect the inner electrodes in a left and right array.

A preferred conductive Ink type is comprised of a Nickel precursor that is stable at room temperature. The Nickel precursor has a metal ion that be reduced to a pure metallic state by a reducing agent and heat. The educing agent and nickel precursor are activated in the temperature in the range of 100-300° C. The reaction of the nickel precursor, reduction agent and heat forms a pure metal deposit.

The nickel precursor and reduction agent can be formulated into a Nano-Ink where the nickel precursor and reducing agent are loaded into a carrier fluid for use in a variety of print processes including inkjet printing, spray deposition and/or screen printing.

Nickel nanoparticles may be added to the nickel precursor and ink.

When nickel is applied as the electrode, a reduced oxygen atmosphere may be applied to reduce and/or eliminate oxidation during heat treatments.

The electrodes may be fabricated in a variety of methods, including but not limited to spray deposition, vapor deposition, extrusion, casting, injection molding and print spray.

Inkjet Deposition

In one embodiment, the present invention applied the mixing of materials during the material deposition process to create a compound using a spray and/or drop-on-demand ink jet printing apparatus. The inkjet deposition system would position the print heads across a two or three dimensional axis with an optional ability to rotate print head alignment to enable the stacking of two dimensional nanoparticle patterned layers to form a three dimensional electronic device.

The use of two or more print heads to mix two materials becomes important when the two materials are incompatible in a single solution. For example: in some instances the pH level of a solution enables particle distribution, which is an important characteristic for inkjet ink passing through an inkjet printer (material deposition system). The pH of two solutions may need to be different to suspend the different materials that would comprise the desired compound material to be deposited in a single layer. In this case, and others, the use of multiple different solutions may be desirable. After the ink (particle solution) has passed through the inkjet head, the particle suspension is less critical. Therefore, the mixing of the two solutions by multiple deposition print heads is a solution to this problem.

The inkjet deposition process for mixing at the deposition layer is as follows:

Define the chemical composition of the layer to be deposited.

Define the stoichiometric values for each chemical in the compound and define the ratio of each chemical in the compound.

Define which chemicals are compatible to be combined in an ink for inkjet deposition, identify the compatible chemicals as chemical groups to be combined into an ink solution.

If there are two or more chemical groups, then we need to determine the chemical and/or particle loading of each ink.

Based on the chemical and/or particle loading of each ink and the ratio of the chemicals to be applied at the deposition layer to create the desired compound, we create a material Deposition Profile (MDP).

The MDP is a ratio of each ink to be applied at the deposition layer, taking into account:

The original chemical stoichiometric formula, and

The particle loading of each ink to be applied.

The combination of the inks to be deposited to achieve the stoichiometric value for the compound mixture.

Selection of the print drop-on-demand process for deposition, which may include layer on layer, interlacing of ink drops, random placement of ink drops and the placement of ink drops in specific patterns.

The Raster Image Software (RIP) and/or ICC Software are modified to reflect chemical composition instead of colors.

A raster image processor (RIP) is a component used in the printing industry which produces a raster image also known as a bitmap. The RIP image is used to generate the patterns to be printed.

In the printing industry colors have been defined by the International Color Consortium (ICC). The ICC color profiles are a set of data that describes the properties of a color space, the range of colors (gamut) that a monitor can display or a printer can output.

In the proposed material deposition system the RIP software would be used to define patterns for the material deposition. As opposed to the ICC profiles, for the mixing of multiple materials within the defined pattern, chemical formulas are applied for the deposition ratio of the multiple materials. The formula takes into consideration the particle loading representing the material within the ink to be deposited, the ratio of the two or more inks to be deposited into the mixed layer and the pattern selected for each material ink. This formula created by a mixture of the materials deposited by print heads is called the Material Deposition Profile (MDP).

Multiple print methods may be applied for mixing the multiple materials. These include but are not limited to print matrix interlacing, specific patterns and multilayer deposition.

A three dimension coordinate system is defined as a Cartesian coordinate system with an ordered triplet of lines (axes) that are pair-wise perpendicular, have a single unit of length for all three axes and have an orientation for each axis. As in the two-dimensional case, each axis becomes a number line. The coordinates of a point P are obtained by drawing a line through P perpendicular to each coordinate axis, and reading the points where these lines meet the axes as three numbers of these number lines.

Figure 10:
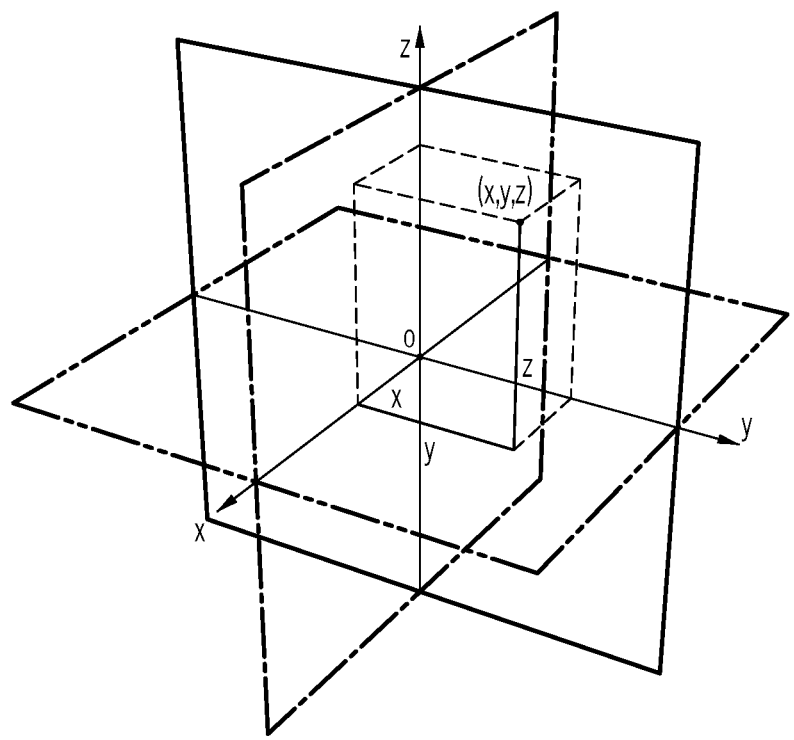
FIG. 10 is an illustration showing a three dimensional Cartesian coordinate system including x, y, and z axes.

In FIG. 10, a three dimensional Cartesian coordinate system is illustrated, with origin O and axis lines X, Y and Z, oriented as shown by the arrows. The tick marks on the axes are one length unit apart. The black dot shows the point with coordinates x=2, y=3, and z=4, or (2, 3, 4).

Figure 11:
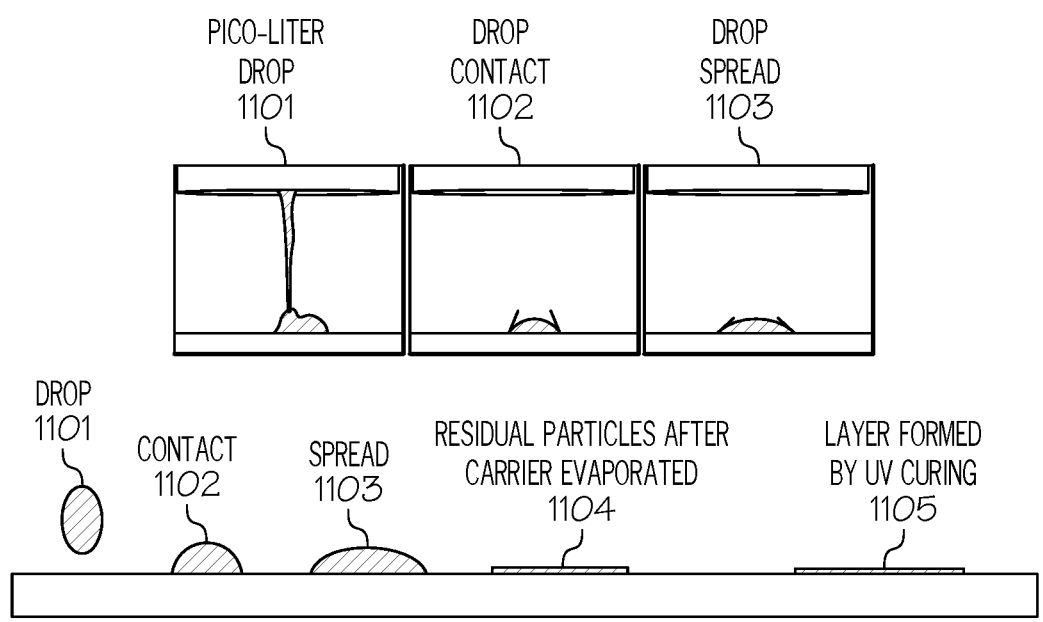
FIG. 11 is an illustration of an example drop, spread and evaporation of nanoparticle ink.

As shown in FIG. 11, the deposition head deposits Nano Ink onto a substrate or an existing layer. The drop on demand process positions Nano Ink with suspended Nanoparticles in a pattern.

Depending on the size of the Nano Ink droplet (1101) and the tension of the Nano-Ink and substrate, the droplet impacts (1102) the substrate or existing layer, spreads (203) out and distributes the nanoparticles. The carrier fluid is evaporated leaving the residual Nanoparticles (1104) in an ultrathin deposition. The layer (1105) may be cured using a variety of methods including Ultraviolet light to activate a photo-initiator and/or an infrared heat.

A deposition resolution is selected to ensure that the Nano Ink droplets and distributed Nanoparticles provide efficient distribution of the Nanoparticles across the pattern.

One or more deposition cycles may be applied to each pattern to ensure that the pattern is filled to the desired thickness with a cohesive covering.

Figure 12:
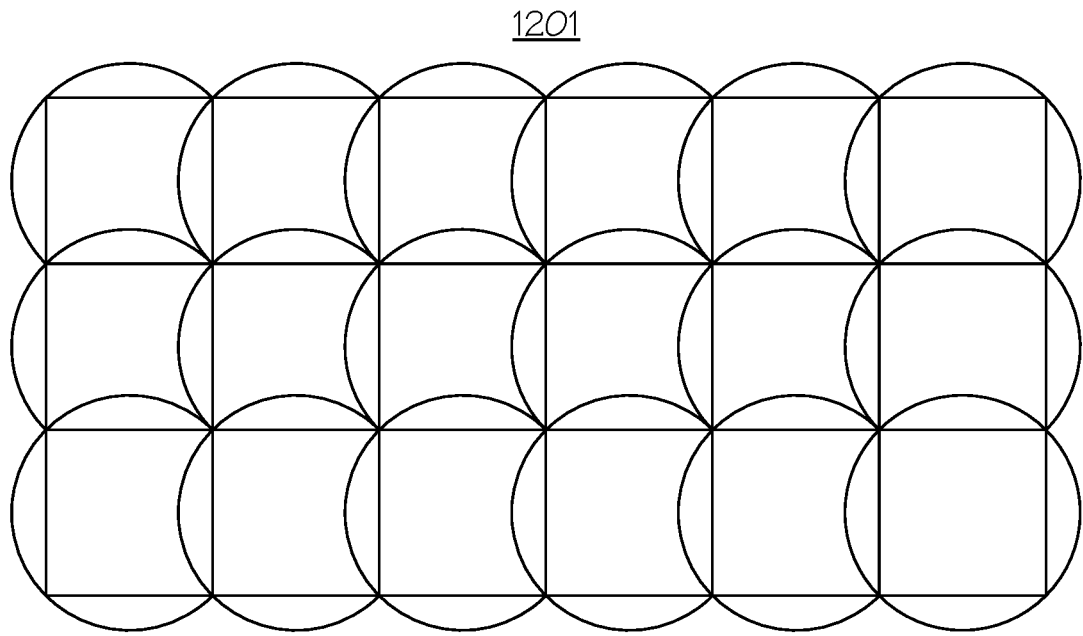
FIG. 12 is an illustration of an example Inkjet Drop pattern.
Figure 17:
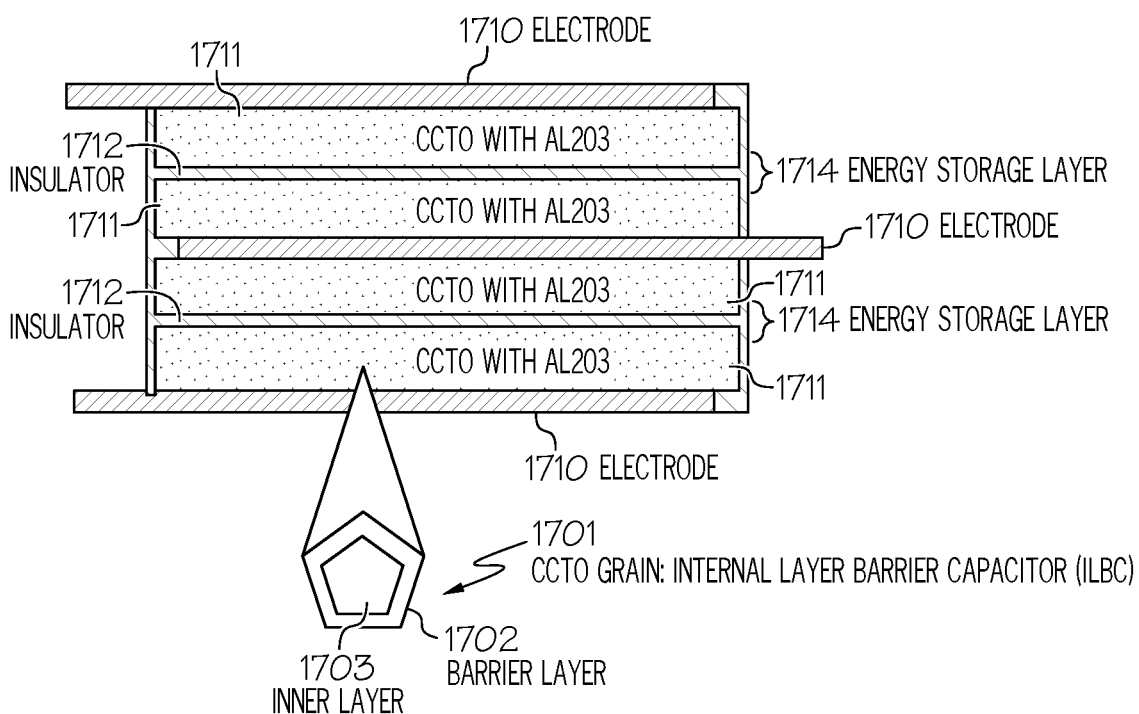
FIG. 17 is an illustration of an example of a DEUC structure having increased permittivity with increased resistivity, according to the present disclosure.

In FIG. 12, an example pattern 1201 of Nanoparticle deposition is illustrated.

Figure 14:
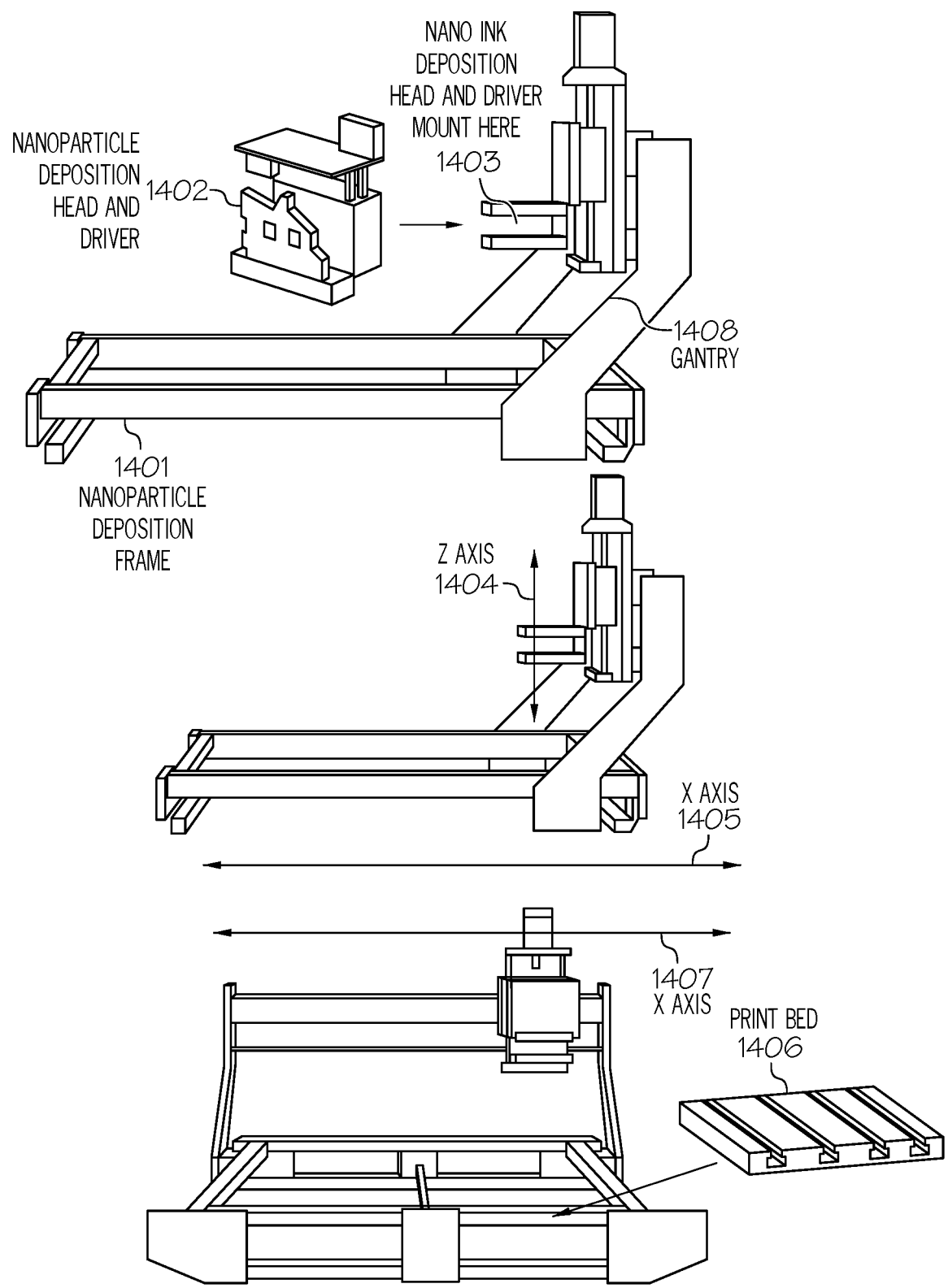
FIG. 14 is an illustration showing a nanoparticle deposition frame structure, according to the present disclosure.

In FIG. 14, a Nanoparticle and precursor material deposition frame is illustrated. The deposition head (1402) is mounted on a fixture (1403) that allows for movement across the deposition bed in an X axis (1405) and can allow the deposition head up or down in relation to the deposition bed Z axis (1404) and allows the deposition head pitch to be altered in various directions.

The gantry (1408) allows for precise X (1405) and Y (1407) axis movement of the deposition head across the deposition bed (1406).

The movement of the gantry (1408) and deposition head is accomplished through the use of stepper motors and control electronics. A power supply and communications is provided to interface with a computer. Remote access and control can be provided.

Optional keyboard, processor and display may enable the Nanoparticle Deposition system to be autonomous.

In FIG. 15, an example of an inkjet compound material deposition flow chart is illustrated. Here, according to the example, two or more materials (1501) are created as inks with a material profile that identifies the material, carrier fluid and particle loading within the ink. The inkjet compound setup processor (1502) creates a profile for each material (ink) that is available for deposition.

The inkjet compound processor (1505) selects the materials to be deposited as a compound based on the desired compound (1503) and the profiles in the inkjet compound setup (1502). The inkjet compound processor, according to the example, sends the following data to the print controller to identify the compound to be printed:

The ratio of each ink to be printed in the compound;
The drop pattern for each ink to be printed in the compound;
The drop size for each ink to be printed in the compound;
The print pattern for each ink to be printed in the compound;
The thickness of the printed compound;
The print cycles required to meet the thickness; and
The drying cycles for the compound.

A substrate is provided for Nanoparticle ink deposition. The substrate may have a non-stick function to allow the multilayer stack to be released from the substrate when the deposition process is completed.

Figure 18:
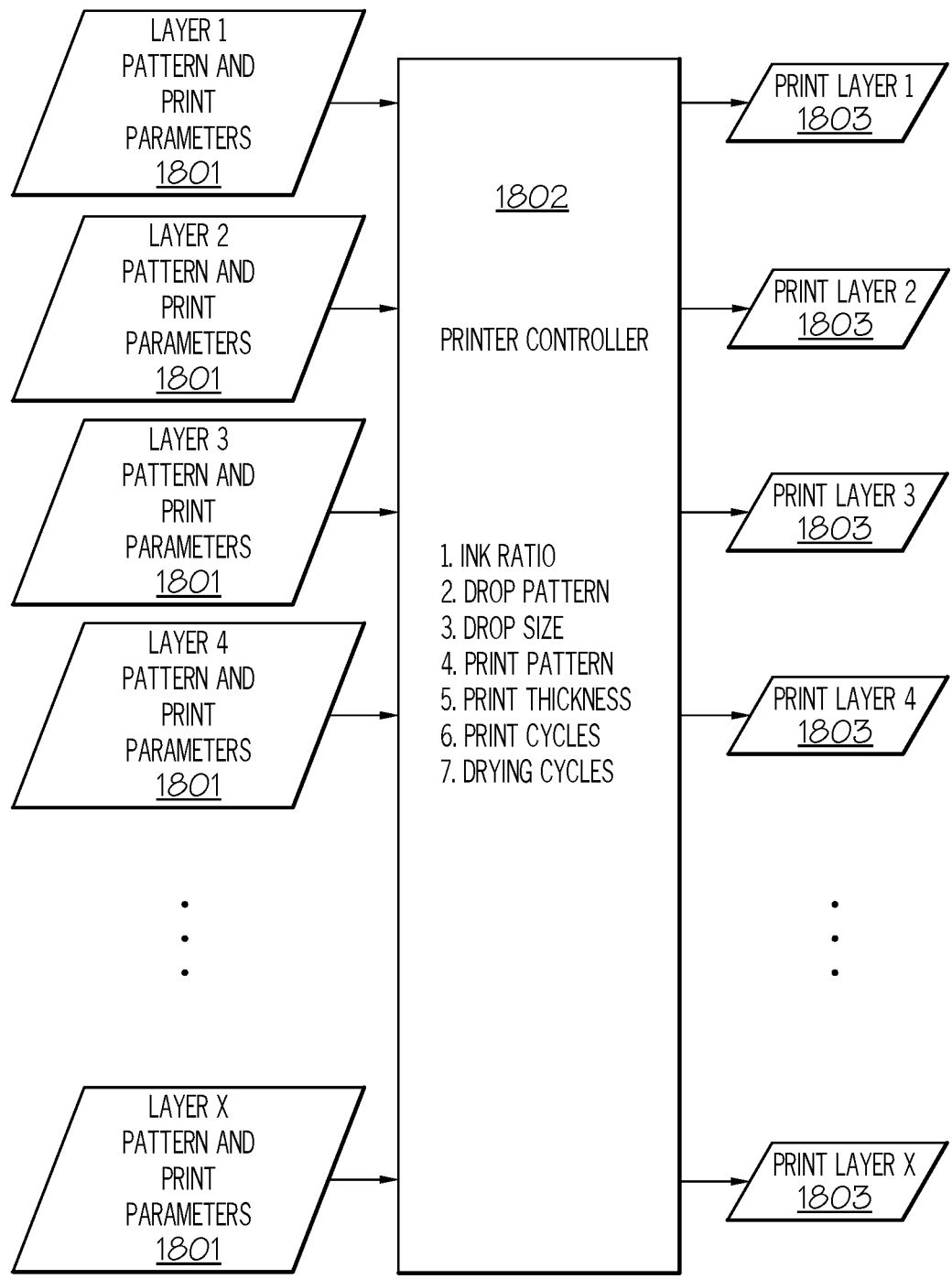
FIG. 18 is an illustration of an example of a DEUC material deposition process for fabricating DEUC layers, in accordance with the present disclosure.

In FIG. 18, an example of an inkjet material deposition process is illustrated. The example of FIG. 15 defines the compounds available for printing. FIG. 18 describes the input into the print controller (1802) for each layer (1801) to be printed. The print controller directs the printing of each layer (1803).

Figure 16:
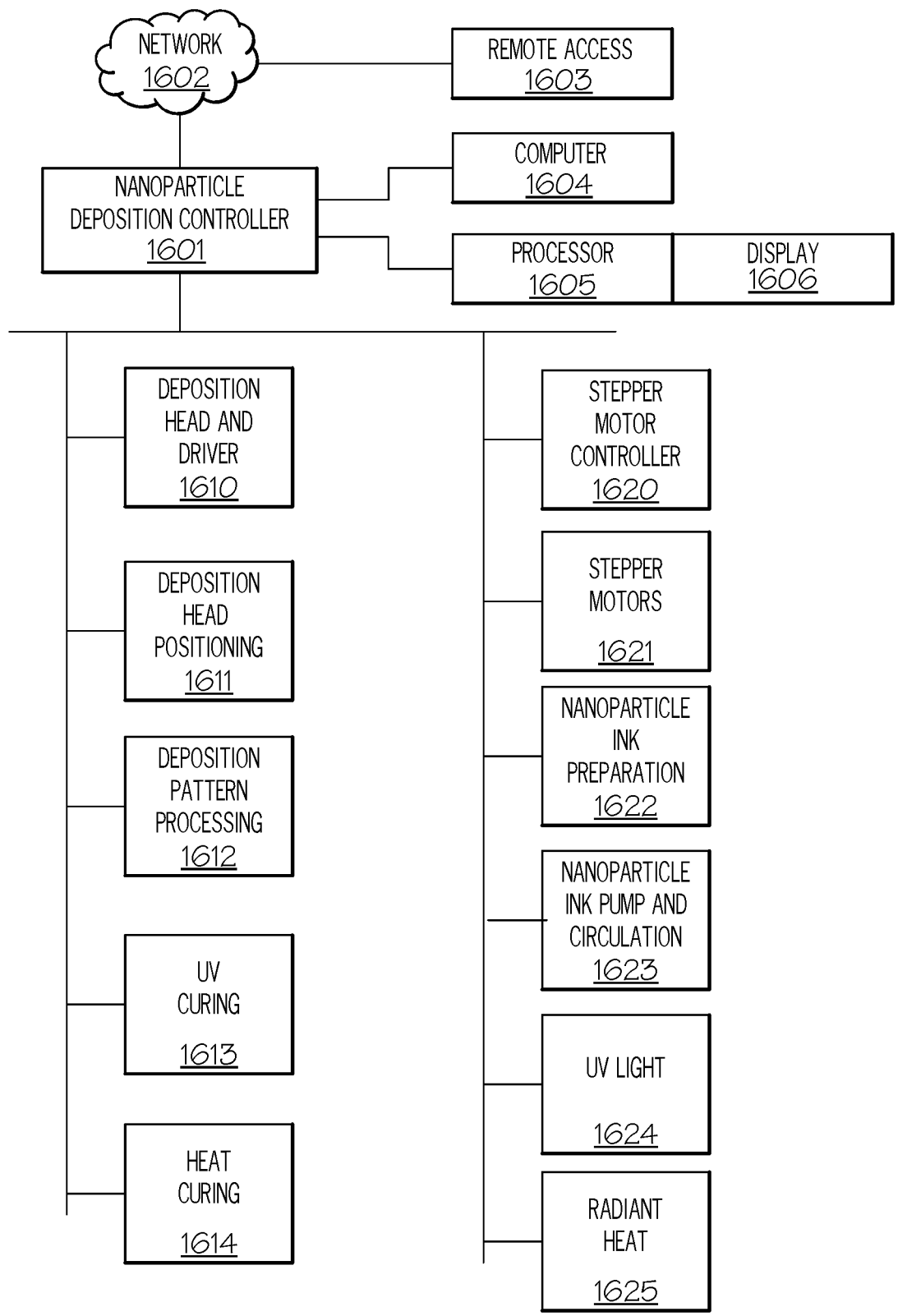
FIG. 16 is a block diagram showing an example of a material deposition system suitable for use in a DEUC fabrication process, according to the present disclosure.

In FIG. 16, example processes used to perform the print process for material deposition are illustrated.

An Image Processor and Materials Deposition Profile (MDP), according to an example, identifies a compound material created through the deposition of multiple materials through independent print heads to create a compound material within the layer (1605) or a computer (1604) to define the deposition patterns for material deposition, a raster image processor (RIP) and material deposition profile (MDP) creates the code to be communicated to the deposition controller (1601) to deposit the one or more types of materials in the desired pattern (1612). An example of a computer program for designing the pattern of the Nanoparticle and/or precursor materials deposition is PowerPoint from Microsoft, Inc.

The raster image controller (1601) provides a high speed data path and electronics that buffer, store, manipulate and route data to the deposition head drivers (1610) in the deposition head array.

Deposition head drivers (1610) configure, power, and drive a deposition head, and can define, create and supply the waveform pulses used by the deposition head to eject the Nanoparticle ink drops.

Deposition printing is a non-impact process. The Nanoparticle and/or precursor material Ink is emitted from nozzles while they pass over the deposition bed. The operation of Nanoparticle and/or precursor materials deposition includes the Nanoparticle ink in various types being squirted onto the print bed or an existing layer to build a multilayer stack.

The deposition head scans the deposition bed in horizontal strips, using the deposition head positioning system (1611) and the frame's stepper motors (1621) to drive the Y axis. A row of Nanoparticle and/or precursor material ink drops are deposited then the gantry moves the deposition head (1610) into place to deposit the next strip. The deposition head (1610) may deposit a vertical row of droplets on each pass.

The deposition head (1610) takes about one half of a second to print the strip across the deposition bed. Multiple deposition heads may be applied to enable more than one ink type.

The deposition head (1610) is a "drop on demand" (DOD) device, squirting small droplets of Nanoparticle and/or precursor material ink onto the deposition bed or existing layer through tiny nozzles. The amount of Nanoparticle or precursor material ink propelled through the nozzles can be configured through the Deposition head driver (1610) software.

After depositing the specified amount of one or more Nanoparticles types to form the desired pattern(s), ultraviolet light or infrared radiation is applied (1613, 1624) is to rapidly cure the layer. This allows the repeated layers to be formed in a continuous process.

The deposition system may be connected to a network (1602) to allow remote access (1603) or connection to a computer (1604).

A multi-layer Nano particle and precursor material deposition system for the fabrication of devices comprised of multiple independent layers each with similar or independent deposition patterns that may have a mixture of materials deposited with a layer that is comprised of:

a) a frame structure that allows a print head to be moved in up to four positions including the x, y, and z axis and an angle of the print head, b) one or more ink jet t head with nozzles configured to allow Nanoparticles and/or precursor materials combined with a binder and a carrier fluid to pass through the print head and be deposited as droplets onto a print substrate or an existing printed layer, c) where the inkjet print head conducts one or more print cycles for each print pattern to form a layer, d) where the layer may be exposed to a headed print bed to reduce, and/or evaporate the carrier fluid, e) where consecutive independent layers may be printed on top of existing layers, and f) where the print head maintains a specified distance from the substrate.

DEUC Energy Storage Device Applications

The DEUC is an energy storage device that can be applied to a broad range of applications and scaled from a micro device to a large system array. Some examples of DEUC applications include, but are not limited to, circuit electronics, mobile devices, electric vehicles, residential and commercial applications, uninterruptible power supplies, support of the electric grid, and the storing of electrical power generated from alternative energy sources such as wind and solar.

The inventor's modeling data has demonstrated DEUC recharge cycles of over 1,000,000 without degradation even with deep cycling and rapid charging of the DEUC. The DEUC provides a rapid recharge cycle time and stores an estimated 4λ the energy of a lithium-ion battery. An array of DEUCs could be configured as electrical energy stations to charge vehicles.

The following represents some of the DEUC module applications:

The DEUC module can be designed and fabricated to store and provide electrical power to at least one of:
micro devices and integrated circuits;
electric vehicles;
unmanned aerial, terrestrial or water vehicles;
electronic cigarettes;
one or more of: mobile computing devices, laptops, tablets, mobile phones, wireless communication devices, and mobile sensor systems;
an electric power grid;
solar, wind, and other alternative energy systems support; and
one or more uninterruptible power supplies.
The DEUC Modules can be coupled with:
one or more solar cells;
one or more radioisotope power cells;
a photovoltaic system;
a thermalvoltaic system;
a movement charge system; and
a manual charge system; and being designed and constructed for providing electric charge to the DEUC module and electric energy storage by the DEUC module.

Figure 9:
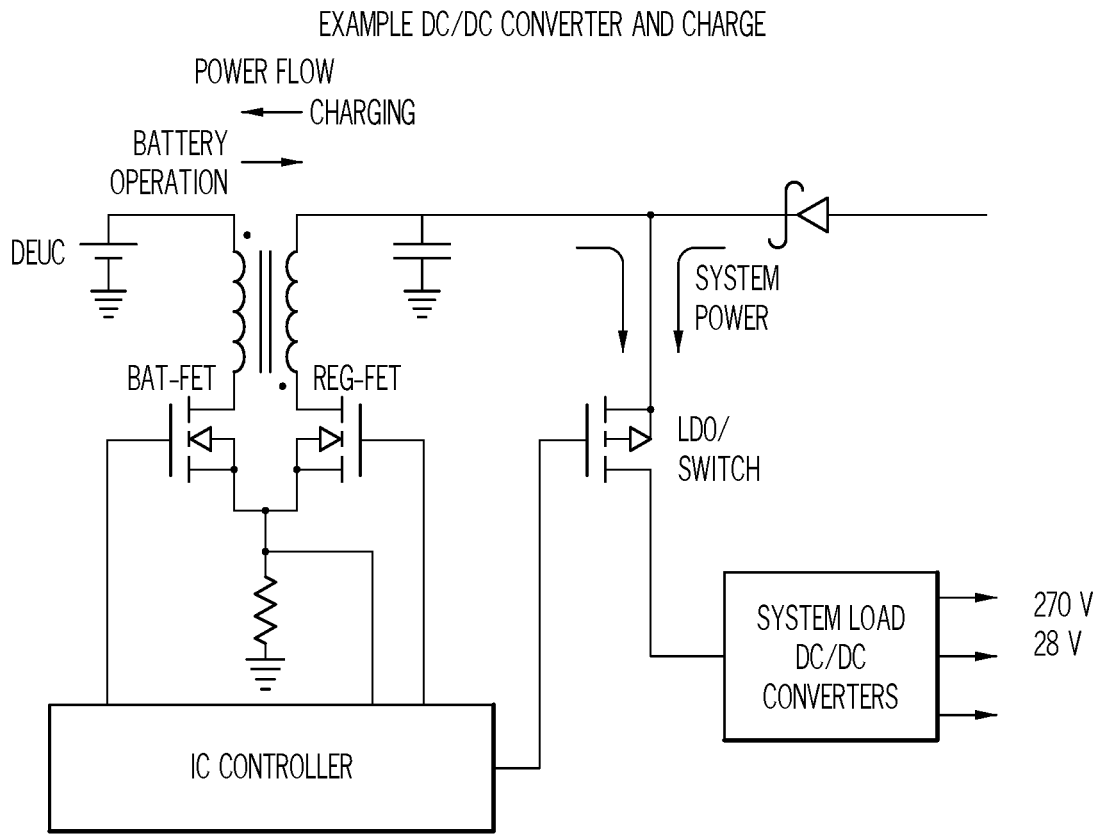
FIG. 9 is an illustration of an example DEUC DC/DC Converter and Charge.

FIG. 9 illustrates an example DEUC DC/DC Convertor and Charge Circuit.

To ensure safety in case of a short in the DEUC energy system, multiple layers of fused and/or switching devices are deployed at strategic points within the DEUC Element, DEUC Stack, DEUC Cell and DEUC Array.

The first fused point is at the Dense Element where the electrode layers within the DEUC Elements are designed to create an open and disconnect from the collection plate upon a short across the left and right electrode.

The next fused point is at the DEUC Stack where the DEUC Element is designed to create an open and disconnect the DEUC Element from the DEUC Stack upon a short between the positive and negative DEUC Stack collectors.

The next safety point is at the DEUC Cell where the DEUC Cell is designed to create an open and disconnect the DEUC Cell from the DEUC array upon a short within the DEUC Cell.

The above applications do not represent the limits of the DEUC Module, and many additional applications can be envisioned.

The features and advantages described in the specification are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

An embodiment of the present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A Dense Energy Ultra Cell (DEUC) energy storage device comprised of one or more DEUC Elements, where each of the DEUC Elements comprises:
   a. a dielectric energy storage layer including solidified CCTO—X material which is comprised of modified calcium, copper, titanate, oxide ($CaCu_3Ti_4O_2$) nanoparticles in a compound mixture including variations in the amounts of any member of the group of copper, calcium, or titanate, resulting in an internal barrier layer capacitor material;
   b. where the internal barrier layer capacitor material is combined with one or more oxide materials comprising at least one of alumina, $Al_2O_3$, calcium oxide, zinc, silver, aluminum, strontium, boron, lanthanum, or any member of the group of materials group VIII of the periodic table; and
   c. a plurality of electrode layers, where the dielectric energy storage layer is interleaved in between the plurality of electrode layers, and where the plurality of electrode layers and the dielectric energy storage layer are stacked directly over each other forming a multilayer thin film including a plurality of layers.

2. The Dense Energy Ultra Cell (DEUC) energy storage device of claim 1, in which each layer of the dielectric energy storage layer and the plurality of electrode layers includes multiple materials that are different from each other, within the each layer providing a composite material design for the each layer.

3. The Dense Energy Ultra Cell (DEUC) energy storage device of claim 1, in which the dielectric energy storage layer includes the solidified CCTO—X material as a solidified CCTO—X precursor ink formed as nano-particles in the compound mixture.

4. The Dense Energy Ultra Cell (DEUC) energy storage device of claim 3, wherein the solidified CCTO—X material comprises a solidified ceramic dielectric solution.

5. The Dense Energy Ultra Cell (DEUC) energy storage device of claim 4, wherein the solidified CCTO—X precursor ink comprises solidified inkjet-printer ink.

6. The Dense Energy Ultra Cell (DEUC) energy storage device of claim 1, wherein the multi-layer thin film includes greater than or equal to 100 layers.

7. The Dense Energy Ultra Cell (DEUC) energy storage device of claim 1, wherein the multi-layer thin film includes greater than or equal to 1,000 layers.

8. The Dense Energy Ultra Cell (DEUC) energy storage device of claim 1, wherein the multi-layer thin film includes greater than or equal to 2,000 layers.

9. The Dense Energy Ultra Cell (DEUC) energy storage device of claim 1, wherein the compound mixture includes oxide nano-particles positioned in-between the calcium, copper, titanate, oxide CCTO nano-particles grain boundaries forming resistive layers.

10. The Dense Energy Ultra Cell (DEUC) energy storage device of claim 9, wherein the oxide nano-particles and insulating material separating the interleaved dielectric energy storage layer from the interleaved electrode layers create high resistivity layers between the electrode layers in the plurality of electrode layers, the high resistivity being greater than $10^4$ ohms resulting in a breakdown voltage of the DEUC Element that is above 50 volts and a reduced self-discharge of less than 20% per year in the DEUC Element.

11. The Dense Energy Ultra Cell (DEUC) energy storage cell device of claim 1, where the dielectric energy storage layer is encapsulated by the insulating material disposed and contacting respectively a top surface, a bottom surface, and sidewalls, of the dielectric energy storage layer thereby encapsulating the energy storage layer.

12. The Dense Energy Ultra Cell (DEUC) energy storage device of claim 1, in which the dielectric energy storage layer includes the solidified CCTO—X material as a solidified CCTO—X type of cast material.

13. The Dense Energy Ultra Cell (DEUC) energy storage device of claim 1, wherein insulating material bifurcates dielectric energy storage layer material while directly contacting and bonding to the dielectric energy storage layer material.

14. A semiconductor structure comprising a dielectric energy storage material layer where an internal barrier layer capacitor material is combined with one or more oxides forming a composite of two or more oxides, wherein the internal barrier layer capacitor material is made of calcium copper titanate oxide (CCTO) combined with aluminum oxide ($Al_2O_3$) forming $CCTO/Al_2O_3$ and combined with $SiO_2$ particles forming a composite of $CCTO/Al_2O_3$ and $CCTO/Al_2O_3/SiO_2$.

* * * * *